Dec. 14, 1965   F. KOPPELMANN   3,223,888
ARC-PREVENTING SWITCHING SYSTEM
Filed Dec. 8, 1960
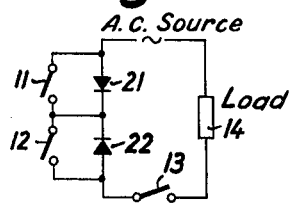
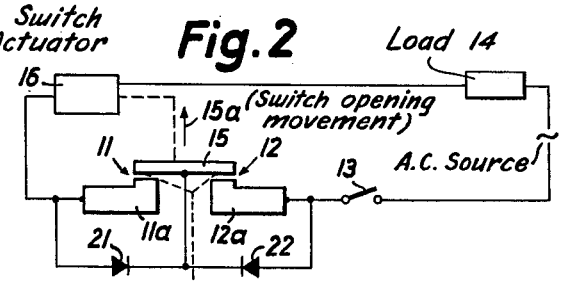
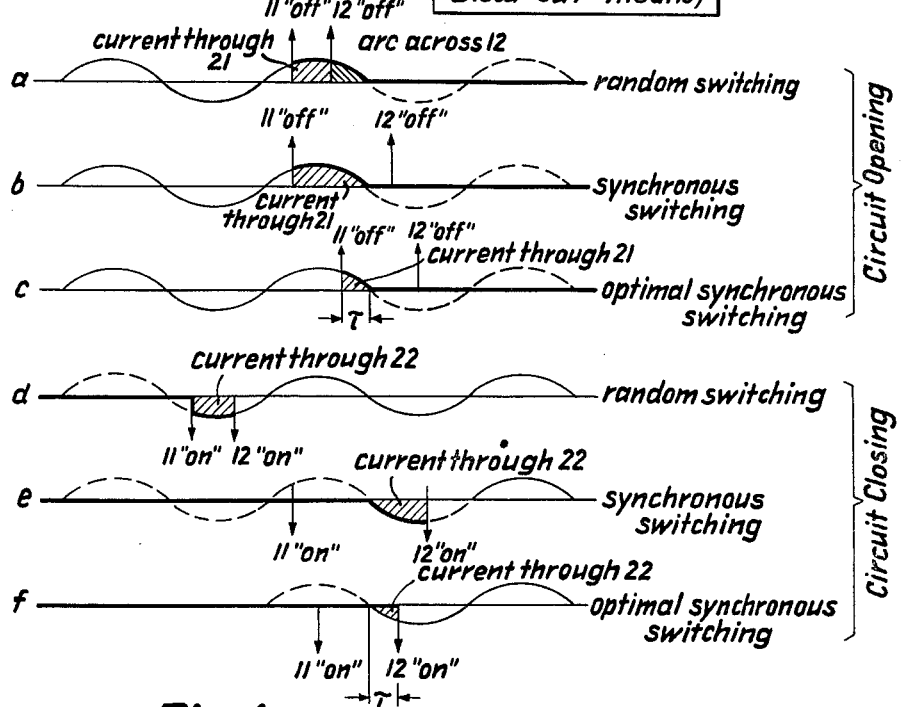
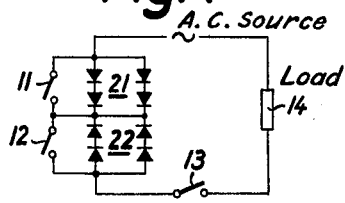

United States Patent Office 3,223,888
Patented Dec. 14, 1965

3,223,888
ARC-PREVENTING SWITCHING SYSTEM
Floris Koppelmann, Berlin-Siemensstadt, Germany, assignor to Licentia Patent-Verwaltungs-G.m.b.H., Frankfurt am Main, Germany
Filed Dec. 8, 1960, Ser. No. 74,657
Claims priority, application Germany, Dec. 14, 1959, L 34,922
6 Claims. (Cl. 317—11)

The present invention relates to a switching circuit.

More particularly, the present invention relates to a switching circuit for interrupting the flow of alternating current, wherein the current is interrupted with little or no arc-over substantially at the time the current passes through zero.

It is the primary object of the present invention to provide a switching circuit which is capable of carrying out the above, and, with this object in view, the present invention resides mainly in a switching circuit incorporated in an alternating current line, which circuit comprises two serially connected switches and at least two monocrystal semiconductor diode rectifiers connected across the switches, respectively, the rectifiers being connected such that they pass current in opposite directions, the switches and rectifiers being of low resistance and low inductance.

Additional objects and advantages of the present invention will become apparent upon consideration of the following description when taken in conjunction with the accompanying drawings in which:

FIGURE 1 is a schematic diagram of a switching circuit according to the present invention.

FIGURE 2 is a specific embodiment of a switching circuit according to the present invention.

FIGURE 3 shows, in graphs (a) through (f), the current flow during different switching operations.

FIGURE 4 is a circuit diagram similar to FIGURE 1, showing a modification.

Referring now to the drawings, and to FIGURE 1 thereof in particular, there is shown a schematic diagram of the switching circuit of the present invention. The same is incorporated in an alternating current line and comprises two serially connected mechanical switches 11 and 12 which have rectifiers 21 and 22 connected in parallel therewith, respectively. The rectifiers are constituted by monocrystal semiconductors of germanium or silicon, and these rectifiers are connected, as shown in FIGURE 1, so that they pass current in opposite directions. The switches and rectifiers are of low resistance and low inductance. The circuit also includes a load 14 and a conventional disconnect switch 13.

When the two switches are closed, the circuit is closed and no current will flow through the rectifiers. When both switches are open, the circuit is interrupted in that the two rectifiers will, during successive half cycles, prevent the flow of current. If it is desired to interrupt the circuit for longer periods without the rectifiers being subjected to any voltage, the disconnect switch 13 may be opened.

FIGURE 2 is similar to FIGURE 1, except that the two switches 11 and 12 are constituted by a single movable contact bridge which cooperates with stationary contacts 11a and 12a pertaining to the switches 11 and 12, respectively, so that when the contact bridge 15 is moved in the direction of the arrow 15a, the switches 11 and 12 will be opened.

In order that the switching circuit operate properly, the switches 11 and 12 should be opened in the proper sequence, and this should be coordinated with the phase of the alternating current flowing through or the voltage appearing across the circuit. For this reason, the bridge 15 is adjusted accordingly, and is connected to a suitable switch actuator, shown schematically at 16, this switch actuator incorporating a saturable core reactor or current transformer and rectifier circuit connected to the line in which the switching circuit is arranged. The switch actuator per se is conventional, and may be of the type shown, for example, in "Die Entwickelung eines lichtbogenfreien Synchronschalters" (The development of an arc-free synchronous switch), by P. Duffing, VDE-Fachberichte (Journal of the Society of German Engineers), volume 14 (1950), pages 41 to 44, particularly at page 43.

FIGURE 3a shows the flow of current through the circuit when the instants at which the switches are opened are selected at random without regard to the phase of the current. Let it be assumed that the switch 11 is opened ahead of the switch 12 by a time interval which is shorter than a half wave, and that both switches are opened during the half wave in which the rectifier 21 is conductive. Current will then flow through the rectifier 21 from the instant switch 11 is opened until the end of the half wave, and an arc-over will occur across the contacts of switch 12 from the instant this switch opens until the end of the half wave. The subsequent half wave is blocked by the diode 21 and the open switch 11. During the next positive half wave, the path across the contacts of switch 12, along which there was no arc during the last half wave, will have been sufficiently deionized so that no current flows between the contacts of switch 12, and the alternating current will remain interrupted.

Similar results will be obtained if the instants at which the switches 11 and 12 open occur during the negative half wave, or if the sequence in which the switches 11 and 12 are opened is reversed.

An arc-less current interruption can be obtained if the opening of the switches 11 and 12 is synchronized with the current. As shown in FIGURE 3b, switch 11 must be opened during the half wave in which the rectifier 21 is conductive, and switch 12 must be opened during the half wave in which the rectifier 22 is conductive. As is shown in FIGURE 3c, the current load of rectifier 21 is least when the instant at which the switch 11 opens is near the end of the half wave during which the rectifier 21 conducts. Since some allowance must be made insofar as the synchronization is concerned, it will be necessary to open the switch 11 not at the very end of the half wave during which the rectifier 21 conducts, but a short time interval $\tau$ ahead of the end of this half wave. Of course, the more accurate the synchronization, the smaller need the interval $\tau$ be.

FIGURE 3d shows the current flow if the switches 11 and 12 are closed at random, i.e., without regard to the phase of the current. If the switch 11 is closed during the wave in which the rectifier 21 is non-conductive, this rectifier will be subjected to a sudden negative pulse of the alternating current. If the switch 12 is closed during the same half wave, then current will flow through the rectifier 22 until that instant, whereafter no current will flow through either of the rectifiers.

FIGURE 3e shows that if the switches 11 and 12 are closed with due regard being given to the current phase, these switches will not be subjected to sudden current surges. Accordingly, the switch 11 is closed during the half wave in which the rectifier 21 is conductive, so that current will not flow through the switch until the start of the next half wave. The switch 12 is closed in the course of this next half wave and thus relieves the rectifier 22. In this case, the switch 11 is closed under no-current condition, whereas the switch 12 will be closed under no-voltage condition, or under conditions in which the voltage across the switch will be the voltage across the rectifier 22 while the same is conductive. This voltage will, in practice, be of the order of 1 volt.

FIGURE 3f shows the optimum instances at which the switches should be closed. Switch 11 can be closed any time during the half wave in which the rectifier 21 conducts, and switch 12 is closed as soon as possible after the start of the half wave during which the rectifier 22 is conductive. Here, too, it is desirable to close the switch 12 not exactly at the start of the last-mentioned half wave, but a short time interval $\tau$ thereafter.

The switching circuit according to the present invention can be used for switching small currents when these currents pass through zero. It is known that a low alternating current will break down at the minimum arcing current, which, depending on the material of which the contacts are made, such as carbon or zinc, is of the order of 0.1 to 5 amperes.

Sometimes, it is desirable to avoid the premature breakdown, and, in accordance with the present invention, the current is allowed to flow until the end of the particular half wave, whereupon it is extinguished in a natural manner.

Thus, if the circuit is a high capacity one, the current may be interrupted, in accordance with the present invention, either with the formation of but a small arc, or, with proper synchronization, without any arc at all. This is accomplished by the above-described rectifiers, the costs of which are compensated by the fact that arc-extinguishing or arc-path cooling means can be eliminated, or, at the very least, be made relatively small. Furthermore, the allowance made for charring or scorching of the contacts, as well as the stroke of the movable contacts, can be kept smaller, which results in a simplified switch structure. This holds particularly true for arc-free switching in which the requisite synchronization is sufficiently accurate if the switches are actuated with a precision of approximately one half wave.

With very large currents and voltages it may be necessary to use several retifiers 21, 22 in series and/or in parallel with each of the switches 11, 12, as shown in FIGURE 4. As a result, the current will be interrupted quickly and safely when the circuit is operating at or near its rated capacity, which result is difficult to achieve with switches alone.

The present invention is also applicable to circuits involving alternating currents of higher frequencies, or circuits in which the recovery voltage has a high natural frequency. Under these conditions, the deionization times during the passes through zero will not suffice to extinguish arcs across the switch contacts, and it will be the parallelly connected rectifiers which produce a deionization time having a duration equal to about a half cycle of the alternating current.

According to another feature of the present invention, the mechanical switches can be replaced by controlled gas discharge tubes or other controlled switching paths, if it is desired to increase the deionization times. This presupposes that the deionization times of the rectifiers are less than those of the parallelly connected switching paths.

The arrangement according to the present invention can also be used for periodic switching operation, especially when, because of contact scorching due to frequent switching or for other reasons, arcing is to be avoided, for example, in motor control systems, carried out by way of relays, during so-called inching operation.

Under certain circumstances it may be expedient to use the switching circuit according to the present invention only for making and breaking contacts during normal operation, while a separate switching system is used in the circuit for the relatively rare case of interrupting the current flow in the event of overload. In this way, the size of the rectifiers can be kept within reasonable limits. For instance, a circuit breaker responsive to short-circuit currents can be connected ahead of the circuit according to the present invention which circuit breaker is so connected with the switches 11 and 12 that upon the occurrence of a short-circuit, opening of the switches 11 and 12 will be prevented. In this way, the rectifiers are protected against high currents which would endanger the rectifiers. When the mechanical switches are closed, it is expedient to transmit the closing impulses from the voltages across the rectifiers, because in this way the positive half ways are separated from the negative half ways. The same thing is done upon current interruption through the rectifiers.

In difficult cases in which a non-arching time interval lasting one half cycle does not readily suffice to deionize the path between the switch contacts, such deionization may be expedited by known means, as, for example, by applying additional cooling, magnetic blow out, streams of compressed gaseous media, or the like, to the path between the switch contacts. This, however, will in many cases not be necessary.

Under certain circumstances, each of the switches 11 and 12 can be constituted by a plurality of serially connected switches, the movable contact of each of which may have a short path of travel. It is also possible to use switches operating in vacuum.

It will be understood that the above description of the present invention is susceptible to various modifications, changes and adaptations, and the same are intended to be comprehended within the meaning and range of equivalents of the appended claims.

I claim:

1. A switching circuit incorporated in an alternating current line, said circuit comprising, in combination: two serially connected mechanical switches; at least two monocrystal semiconductor rectifiers connected across said switches, respectively, said rectifiers being connected such that they pass current in opposite directions; and means for opening and closing said switches sequentially with each switch being opened and closed during the half wave in which the rectifier in parallel with the respective switch is conductive.

2. The switching circuit as defined in claim 1, further comprising a mechanical disconnect switch in series with said two switches.

3. The switching circuit as defined in claim 1 wherein there are a plurality of serially-connected rectifiers connected in parallel across each of said switches, and wherein the number of serially connected rectifiers connected in parallel across each of said switches is so selected that after a currentless half wave each switch will have been deionized sufficiently to prevent subsequent breakdown.

4. A switching circuit as defined in claim 1 wherein said switches and said rectifiers are of low resistance and low inductance.

5. A switching circuit incorporated in an alternating current line, said circuit comprising, in combination: two serially connected mechanical switches; at least two monocrystal semiconductor rectifiers connected across said switches, respectively, said rectifiers being connected such that they pass current in opposite directions; and means for opening each of said switches shortly before the end of the half cycle during which the rectifier in parallel with the respective switch is conductive.

6. A switching circuit incorporated in an alternating current line, said circuit comprising, in combination: two serially connected mechanical switches; at least two monocrystal semiconductor rectifiers connected across said switches, respectively, said rectifiers being connected such that they pass current in opposite directions; and means for closing each of said switches shortly after the start of the half wave during which the rectifier in parallel with the respective switch is conductive.

References Cited by the Examiner

UNITED STATES PATENTS

| | | | |
|---|---|---|---|
| 523,074 | 7/1894 | Kester | 200—166 |
| 1,067,003 | 7/1913 | Deats | 200—166 X |
| 1,669,493 | 5/1928 | Slepian | 317—11.1 |
| 2,221,720 | 11/1940 | Prince | 200—148.7 |
| 2,736,830 | 2/1956 | Savage | 200—166 |
| 2,824,939 | 2/1958 | Clayburn et al. | 200—148 X |

FOREIGN PATENTS 638,981   11/1936   Germany.

SAMUEL BERNSTEIN, *Primary Examiner.*